US011662054B2

(12) United States Patent
Foster

(10) Patent No.: US 11,662,054 B2
(45) Date of Patent: May 30, 2023

(54) WEBCAM SYSTEMS AND MOUNT ASSEMBLIES

(71) Applicant: Next Episode Inc., Nome, AK (US)

(72) Inventor: Ian Foster, Nome, AK (US)

(73) Assignee: NEXT EPISODE INC., Nome, AK (US)

( * ) Notice: Subject to any disclaimer, the term of this patent is extended or adjusted under 35 U.S.C. 154(b) by 0 days.

(21) Appl. No.: 17/367,188

(22) Filed: Jul. 2, 2021

(65) Prior Publication Data
US 2022/0214006 A1 Jul. 7, 2022

Related U.S. Application Data

(60) Provisional application No. 63/134,929, filed on Jan. 7, 2021.

(51) Int. Cl.
F16L 3/00 (2006.01)
F16M 11/04 (2006.01)
F16B 2/10 (2006.01)
F16M 13/02 (2006.01)
H04N 23/50 (2023.01)

(52) U.S. Cl.
CPC ............. F16M 11/041 (2013.01); F16B 2/10 (2013.01); F16M 13/022 (2013.01); H04N 23/50 (2023.01)

(58) Field of Classification Search
CPC ....... F16M 11/041; F16M 13/022; F16B 2/10; H04N 5/2251
USPC ........................................................ 248/121
See application file for complete search history.

(56) References Cited

U.S. PATENT DOCUMENTS

| 8,356,784 B2 * | 1/2013 | Doll ..................... F16M 13/022 248/316.1 |
| 9,615,054 B1 | 4/2017 | McNelley et al. |
| 9,819,907 B2 | 11/2017 | McNelley et al. |
| 9,848,169 B2 | 12/2017 | McNelley et al. |
| 10,129,506 B2 | 11/2018 | McNelley et al. |
| 10,512,322 B2 * | 12/2019 | Washington ......... F16M 13/022 |
| 10,841,535 B2 | 11/2020 | McNelley et al. |

(Continued)

FOREIGN PATENT DOCUMENTS

| DE | 102012216615 A1 | 3/2014 |
| JP | 2010147535 A * | 7/2010 |
| JP | 2010147535 A | 7/2010 |

OTHER PUBLICATIONS

"Cool Backer", Https://collbacker.com/finally-make-eye-contact-on-video-calls-with-the-view-you-cam/ Dec. 31, 2020.

(Continued)

Primary Examiner — Todd M Epps
(74) Attorney, Agent, or Firm — Dorsey & Whitney LLP

(57) ABSTRACT

Webcam systems and mount assemblies are disclosed that can dispose a camera at or near a middle of computer monitor whereby a user is viewed by the camera from a face-front position, and wherein the position of the camera is vertically and laterally manually adjustable (without tools) to facilitate a variety of positions according to need or desire. The webcam systems and mount assemblies further may be used with any of a tablet computing device, a laptop computer, a free-standing computer monitor, etc., and may be mounted to any edge or an adjacent structure while permitting disposing the camera at or near a center of the monitor.

21 Claims, 6 Drawing Sheets

(56) References Cited

U.S. PATENT DOCUMENTS

| | | |
|---|---|---|
| 11,258,983 B2 | 2/2022 | McNelley et al. |
| 2010/0171007 A1 | 7/2010 | Doll et al. |
| 2021/0377490 A1 | 12/2021 | McNelley et al. |
| 2021/0392290 A1 | 12/2021 | McNelley et al. |

OTHER PUBLICATIONS

"HUE HD Portable USB Camera", https://www.amazon.co.uk/gp/product/B001LEGDEG/ref=ppx_yo_dt_b_search_asin_title?ie=UTF8&psc=1.
"KANO webcam", https://kano.me/store/products/webcam 2021.
PCT/US2021/072999, International Search Report and Written Opinion, Feb. 23, 2022, 10 pages.

\* cited by examiner

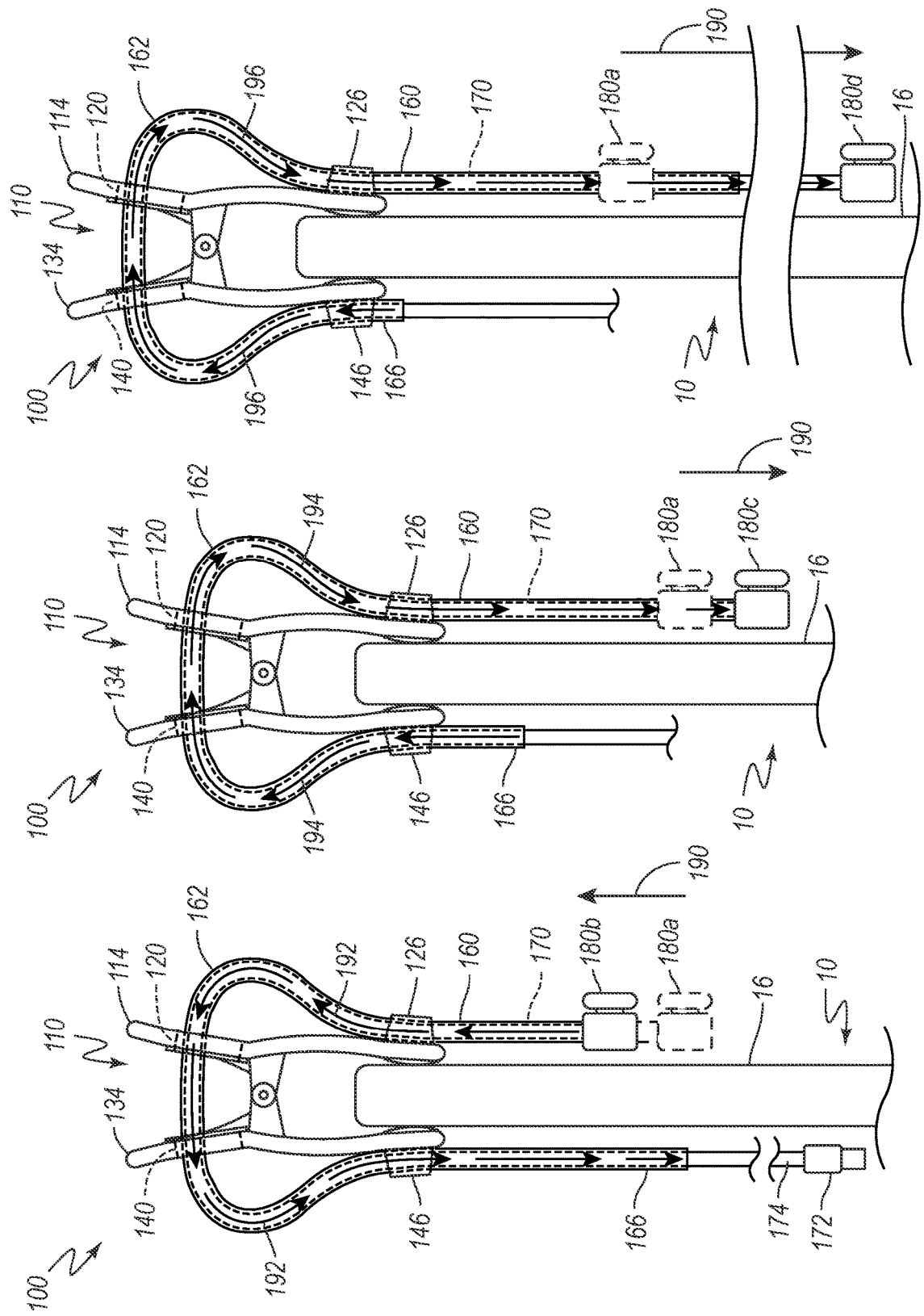

WEBCAM SYSTEMS AND MOUNT ASSEMBLIES

RELATED APPLICATIONS

This application claims priority to U.S. Provisional Application No. 63/134,929, filed on Jan. 7, 2021 and titled "ADJUSTABLE MIDDLE SCREEN WEBCAM," which is hereby incorporated by reference in its entirety.

TECHNICAL FIELD

The present disclosure relates generally to the field of videography. More particularly, it relates to systems and assemblies for disposition of a video sensor to a computer monitor.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments and are, therefore, not to be considered limiting of the scope of the disclosure, the embodiments will be described and explained with specificity and detail in reference to the accompanying drawings.

FIG. 5A is a side view of the center webcam system of FIG. 4, and showing upward repositioning of the camera, relative to FIG. 4.

FIG. 5B is a side view of the center webcam system of FIG. 4, and showing downward repositioning of the camera, relative to FIG. 4.

FIG. 5C is a side view of the center webcam system of FIG. 4, and showing downward repositioning of the camera, relative to FIG. 4.

DETAILED DESCRIPTION

Figure 1:
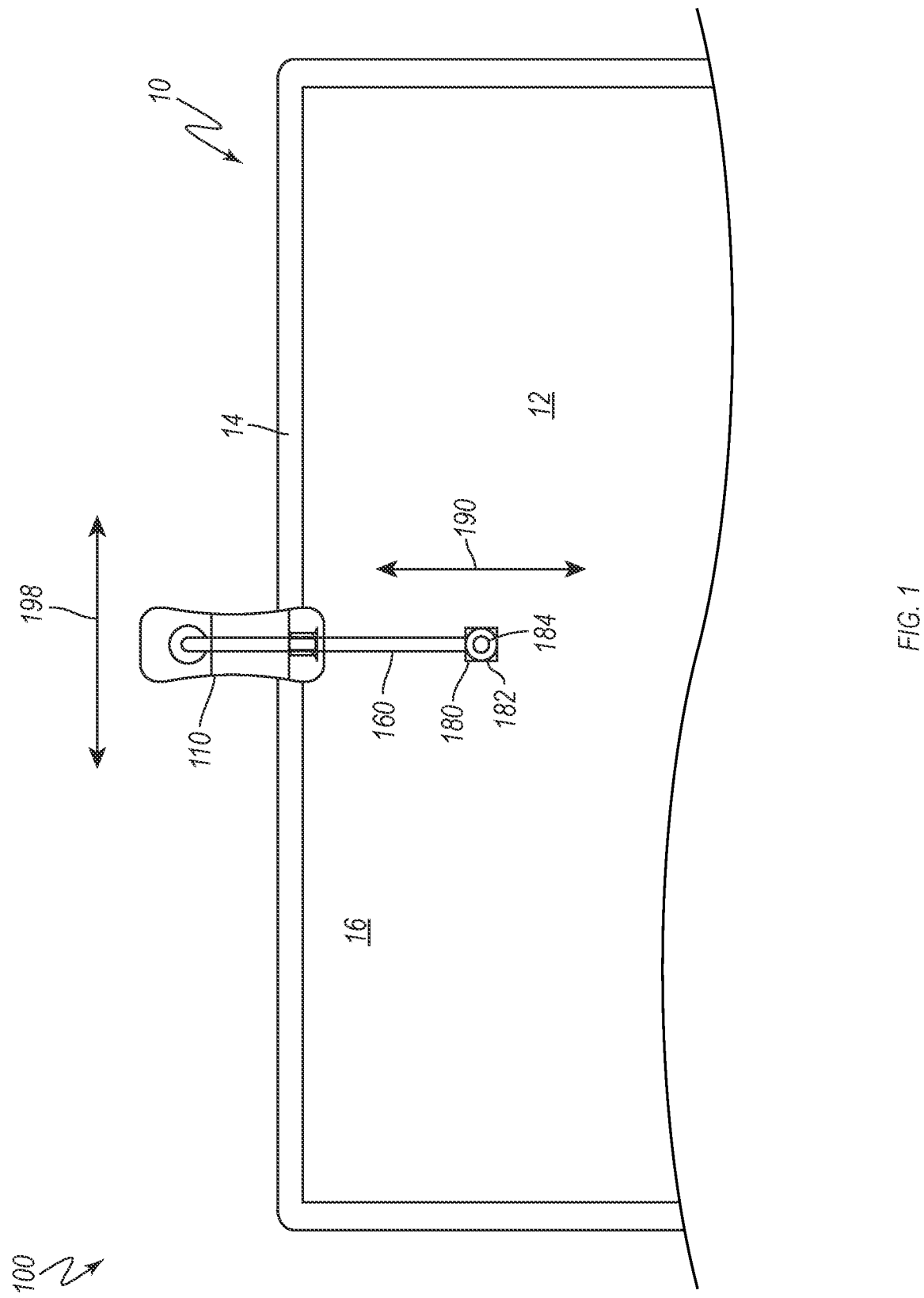
FIG. 1 is a front view of a portion of a computer monitor and a webcam system coupled thereto, according to one embodiment of the present disclosure.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Use of a computer system to virtually attend or participate with one or more individuals (or a group) distant to a user of the computer may entail use of a video camera, or webcam, to capture and transmit a real-time image of the user for viewing by other participants. Most webcams currently are designed to be disposed away from the center of a user's computer monitor so as not to obstruct the user's view of imagery displayed at the computer monitor. As the user is observing the computer monitor, the user's eyes are directed generally away from the webcam, which presents an averted view of the user to any other participant. Disposition of the webcam at or near the center of the user's point of observation allows the webcam to capture images (video) of the user looking at, or nearly at, the webcam, providing participants with an experience much more akin to that of in-person participation; enhances visual (non-verbal) communication; and provides a more meaningful interaction between participants.

The present disclosure describes a webcam that is small enough to be unobtrusive when disposed in front of a computer monitor, portable enough to be used with a portable computing device (laptop computer, tablet computer, etc.), and adjustable enough to meet a wide variety of situations, while also being compact and light.

Moreover, the phrases "connected to" and "coupled to" are used herein in their ordinary sense, and are broad enough to refer to any suitable coupling or other form of interaction between two or more entities, including mechanical interaction. Two components may be coupled to each other even though they are not in direct contact with each other. The phrase "attached to" refers to interaction between two or more entities that are in direct contact with each other and/or are separated from each other only by a fastener of any suitable variety (e.g., an adhesive, etc.).

The term "opposite" is a relational term used herein to refer to a placement of a particular feature or component in a position corresponding to another related feature or component wherein the corresponding features or components are positionally juxtaposed to each other. By way of example, a person's right hand is opposite the person's left hand.

The terms "a" and "an" can be described as one, but not limited to one. For example, although the disclosure may recite an element having, e.g., "a line of stitches," the disclosure also contemplates that the element can have two or more lines of stitches.

Unless otherwise stated, all ranges include both endpoints and all numbers between the endpoints.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment. Not every embodiment is shown in the accompanying illustrations; however, at least a preferred embodiment is shown. At least some of the features described for a shown preferred embodiment are present in other embodiments.

The term "middle region" as used herein refers to a space within a that is generally within a perimeter. The term "center" as used herein refers to a region with the middle region, rather than to a specific point. By way of example, a location that is nearer a physical midpoint than a perimeter or edge may be said to be in the center, although the location may be other than at the exact physical midpoint.

The term "display" as used herein refers to an electronic device, along with its housing and electrical/electronic component configured to render a visual image or video. Examples of a display include, e.g., a built-in computer monitor, a standalone computer monitor, a display of a personal computing device, a television, etc.

FIG. 1 is a front view of a portion of a display 10 having disposed to it a center webcam system 100, according to an embodiment of the present disclosure. The display 10 comprises a display area 12 disposed at a front side 16 of the display 10, and a bezel 14 disposed around a perimeter of the display area 12. The center webcam system 100 comprises a clip 110, a semi-rigid flexible conduit 160, and a camera 180. The camera 180 comprises a housing 182 and a sensor 184. The camera 180 is disposed with the sensor 184 oriented away from the display area 12 and toward a user and, more particularly, toward a user's face. The semi-rigid flexible conduit 160 is configured to permit convenient vertical adjustment 190, as hereafter described. The clip 110 is configured to couple to or at an edge of the display 10. The clip 110 is configured to couple to, accept, receive, or otherwise engage the semi-rigid flexible conduit 160. In other words, the clip 110 is couplable to the semi-rigid flexible conduit 160. The center webcam system 100 is configured to position the camera 180 on or in front of the display area 12 of the display 10. The camera 180 may be displaced a distance from the edge of the display toward a middle region of the display 10. The clip 110 is configured to permit convenient lateral adjustment 198. In combination, the clip 110 and the semi-rigid flexible conduit 160 enable a user to easily dispose the camera 180 at any appropriate location of the display area 12, including at, near, or about the center of the display area 12. The center webcam system 100 is configured to position the camera 180 in a middle region (or center, or central area) of the display area 12 of the display 10.

Figure 2A:
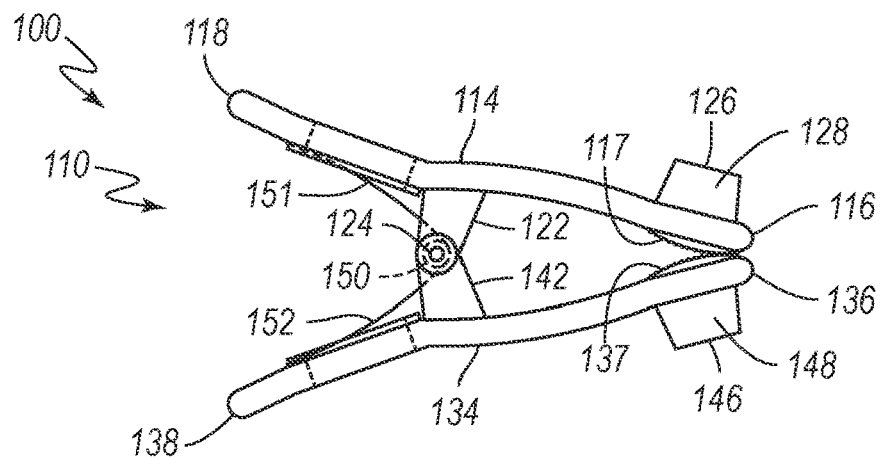
FIG. 2A is a side view of a clip of a webcam system, according to one embodiment of the present disclosure.
Figure 2B:
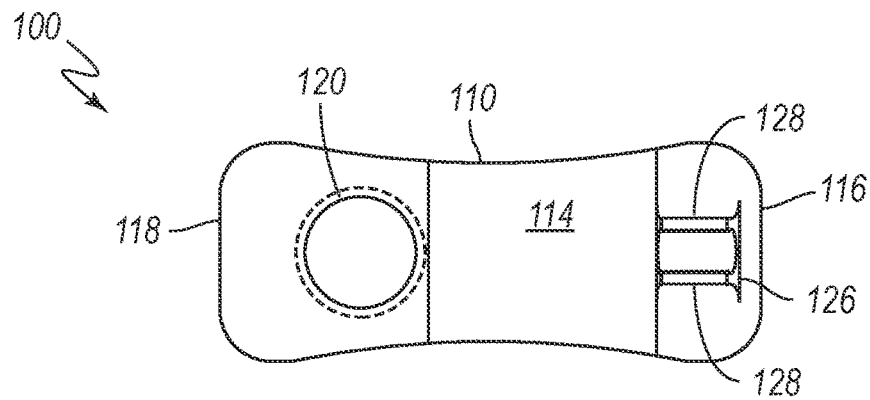
FIG. 2B is a top view of the clip of FIG. 2A, showing a first component.
Figure 2C:
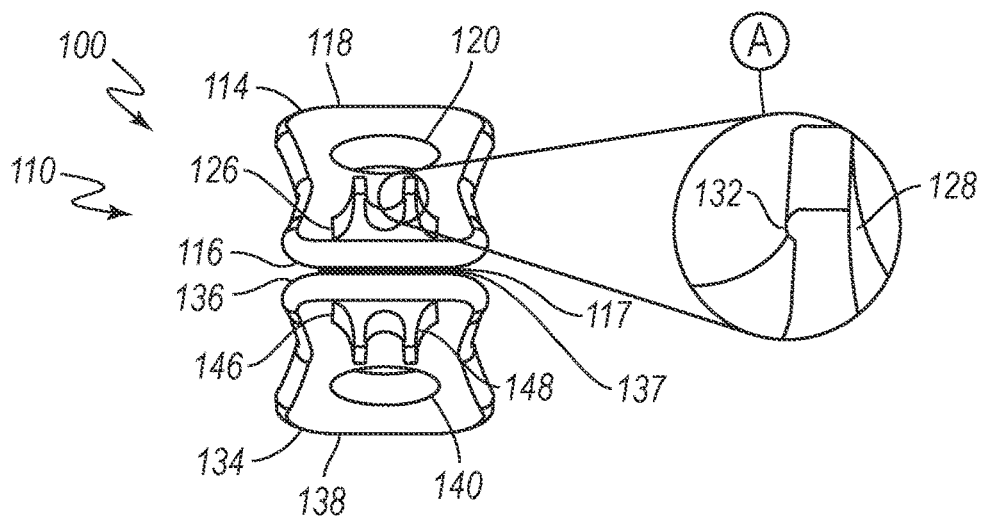
FIG. 2C is a front view of the clip of FIG. 2A.

FIGS. 2A-2C are detailed views of the clip 110 of the center webcam system 100. FIG. 2A is a side view of the clip 110. The clip 110 comprises a first component 114 and a second component 134. As will become evident, the second component 134 is, in every essential aspect, a second iteration of the first component 114 that has been rotated about an axis to be coupled to the first component 114. In some embodiments, the first component 114 and the second component 134 are the exact same, which may facilitate ease of manufacturing. For example, the first component 114 and the second component 134 may use the same mold. One of the first component 114 and the second component is inverted 134 to couple the first component 114 to the second component 134.

The first component 114 comprises a first end 116 and a second end 118 distal to the first end 116. The second component 134, likewise, comprises a first end 136 and a second end 138 distal to the first end 136. The first and second components 114, 134 each comprise a pivot arm 122, 142, respectively. The pivot arms 122, 142 are coupled at a pivot 124 (e.g., pivot point). Said otherwise, the first component 114 couples to the second component 134 at the pivot 124, the pivot 124 being disposed between the first and second ends 116, 118, respectively, of the first component 114 and between the first and second ends 136, 138, respectively, of the second component 134. A biasing member 150 is disposed at the pivot 124. The biasing member 150 serves to apply a force to cause the second ends 118, 138 to be disposed away from each other, and, through effect of the pivot 124, cause the first ends 116, 136 to be pushed together. The biasing member 150 may comprise a means or mechanism to apply a force to each of the first and second components 114, 134, such as a torsion spring, a compression (volute or conical) spring, a leaf spring, etc. The biasing member 150 may comprise a first end 151 disposed at or against a portion of the first component 114 near the second end 118, and a second end 152 disposed at or against a portion of the second component 134 near the second end 138. In other words, the clip 110 comprises or couples to the biasing member 150 that biases the clip 110 to a closed configuration with the corresponding first ends 116, 136, respectively, of the first component 114 and the second component 134 biased toward each other. The clip 110 is thus configured to couple to the display 10 by engaging the display 10 at or near an edge of the display 10 on both the front (or user facing side) of the display 10 and a back side of the display 10.

The clip 110 is configured to permit the display 10 to be pinched (or gripped by the clip 110) between the first end 116 of the first component 114 and the first end 136 of the second component 134. The first end 116 of the first component 114 may comprise a first grip 117 on an inside surface of the first component 114 at the first end 116 and the first end 136 of the second component 134 may comprise a second grip 137 on an inside surface of the second component 134 at the first end 136. The first grip 117 and the second grip 137 may be fabricated from any suitable material that can grip the display 10 without damaging the display 10. For example, the first grip 117 and the second grip 137 may be a silicone or other suitable rubber. In some embodiments, the first grip 117 and the second grip 137 may have a textured surface for additional grip to secure the clip 110 to the display 10.

The first component 114 also comprises a first securement mechanism 126. The first securement mechanism 126 further comprises at least one arm 128 that extends from the first component 114 and is configured to partially encompass a circumference of a portion of the semi-rigid flexible conduit 160. The second component 134 comprises a second securement mechanism 146, the second securement mechanism 146 further comprising at least one arm 148 and is configured to partially encompass a circumference of a portion of the semi-rigid flexible conduit 160.

Said otherwise, the clip 110 comprises a securement mechanism that includes the first securement mechanism 126 disposed on the first component 114 between the first end 116 and the pivot 124 and the second securement mechanism 146 disposed on the second component 134 between the first end 136 and the pivot 124, wherein the first securement mechanism 126 is configured to couple the semi-rigid flexible conduit 160 to the clip 110 and the second securement mechanism 146 is configured to couple the semi-rigid flexible conduit 160 to the clip 110. In some embodiments, the securement mechanism of the clip 110 may only include the first securement mechanism 126 or the second securement mechanism 146. In some embodiments, the first securement mechanism 126 may be disposed between the pivot 124 and the second end 118 and the second securement mechanism 146 may be disposed between the pivot 124 and the second end 138. In some embodiments, the first component 114 may comprise two first securement mechanisms, one disposed on each side of the pivot 124, and the second component 134 may comprise two second securement mechanisms, one disposed on each side of the pivot 124. In some embodiments, the clip 110 may comprise a variety of different configurations or combinations of the securement mechanism discussed above.

FIG. 2B is a top view of the clip 110 of the center webcam system 100 of FIG. 2A, showing the first component 114. The first end 116 and the second end 118 of the first component 114 are shown for reference. The first securement mechanism 126 is shown having two arms 128. In other words, in the embodiment of FIG. 2B, the first securement mechanism 126 comprises a first and second arms 128 that extend away from the first component 114, wherein the first and second arms 128 are configured to partially encompass a portion of the semi-rigid flexible conduit 160. The first component 114 also comprises a first aperture 120 that is disposed between the pivot 124 and the second end 118 of the first component 114, wherein the first aperture 120 is configured to receive (accept, or otherwise accommodate) the semi-rigid flexible conduit 160. The second component 134 is configured substantially identical to the first component 114, having a second aperture 140 disposed between the pivot 124 and the second end 138 of the second component 134, wherein the second aperture 140 is configured to receive the semi-rigid flexible conduit 160.

FIG. 2C is a front view of the clip 110 of the center webcam system 100 of FIG. 2A. The first and second components 114, 134 are shown for reference, along with their respective first ends 116, 136 and second ends 118, 138. The first aperture 120 of the first component 114 and a second aperture 140 of the second component 134 are shown. A callout A provides a closer view of a portion of the first securement mechanism 126. In the callout A, the arm 128 is shown, and is configured with a lip 132. Each arm 128 of the first securement mechanism 126, as well as each arm 148 of the second securement mechanism 146, is likewise configured with a lip 132. With the lip 132 on each arm 128, 148 of the first and second securement mechanisms 126, 146, the first and second securement mechanisms 126, 146 are particularly configured to couple with and retain a semi-rigid flexible conduit 160. The inner surface of the first and second securement mechanisms 126, 146 are configured to allow the semi-rigid flexible conduit 160 to slide in a longitudinal direction of the clip 110 and still secure the semi-rigid flexible conduit 160. A predetermined amount of force is needed to overcome the lips 132 to remove the semi-rigid flexible conduit 160 from the first and second securement mechanism 126, 146.

Figure 3:
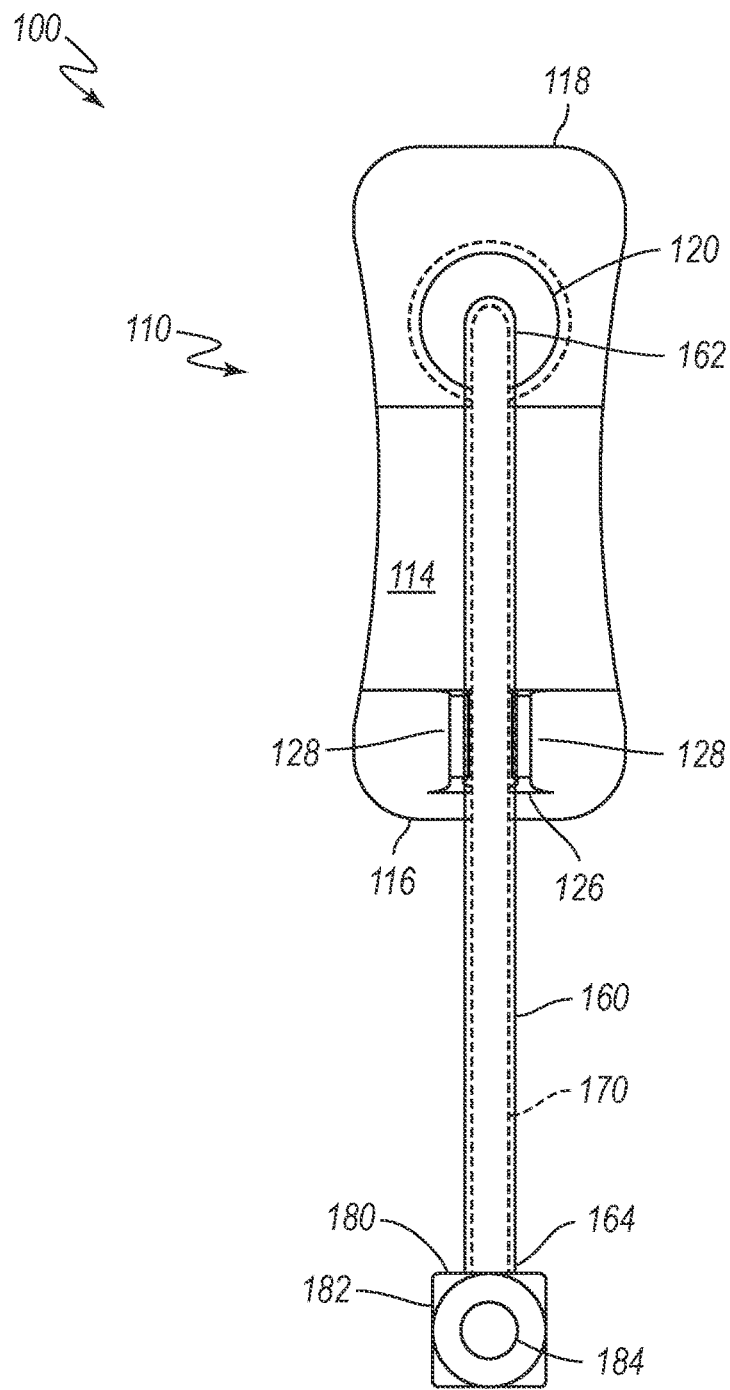
FIG. 3 is a front view of a webcam system including a semi-rigid flexible conduit and the camera, according to one embodiment of the present disclosure.

FIG. 3 is a front view of the center webcam system 100 having the semi-rigid flexible conduit 160 and the camera 180. The first end 116 and the second end 118 of the first component 114 are shown for reference. The semi-rigid flexible conduit 160 is coupled to the first securement mechanism 126 and, more particularly, is disposed between the two arms 128. The semi-rigid flexible conduit 160 may be retained at the first securement mechanism 126 as by friction fit, compression fit, interference fit, etc. The lip (see the lip 132 in FIG. 2C) may facilitate retaining the semi-rigid flexible conduit 160 coupled to the first component 114. The fit of the semi-rigid flexible conduit 160 to the clip 110 is sufficient to retain the semi-rigid flexible conduit 160 in a user-preferred position.

The camera 180 may be disposed at or near a first end 164 of the semi-rigid flexible conduit 160. The housing 182 of the camera 180 may couple at the first end 164 to the semi-rigid flexible conduit 160 whereby the sensor 184 is oriented to face away from the display area 12 of the display 10, such as a computer monitor, toward a user of the computer monitor. A body 162 of the semi-rigid flexible conduit 160 may pass through the first aperture 120 of the first component 114 of the clip 110 (and, likewise, through the second aperture 140 of the second component 134). A cable 170 may pass through the semi-rigid flexible conduit 160 whereby the camera 180 may be electrically and communicatively coupled to a computer associated with the display 10. The semi-rigid flexible conduit 160 is more rigid than the cable 170 and less flexible than the cable 170. A portion of the cable 170 is disposed within the semi-rigid flexible conduit 160 with the camera 180 disposed outside of the first end 164 of the semi-rigid flexible conduit 160, and a connector 172 is disposed outside a second end 166 (see FIG. 5A) of the semi-rigid flexible conduit 160. In other words, the cable 170 may have the camera 180 coupled at the first end 164 and a connector 172 coupled at a second end 174 of the cable 170. The connector 172 may be any connector capable of electrically and communicatively coupling the cable 170 and the camera 180 to a computing device. The cable 170 and the connector 172 may be configured to couple the camera 180 to the computing device to enable the computing device to receive images from the camera 180 wherein the images are one or more of a still image, a series of still images, a video, etc. In one embodiment, the cable 170 and the semi-rigid flexible conduit 160 may be mutually configured to provide a degree of resistance to movement of the cable 170 within or through the semi-rigid flexible conduit 160. Said otherwise, when the clip 110 is coupled to the display 10, the semi-rigid flexible conduit 160 is coupled to the first component 114 of the clip 110 on a user facing side of the display 10.

Figure 4:
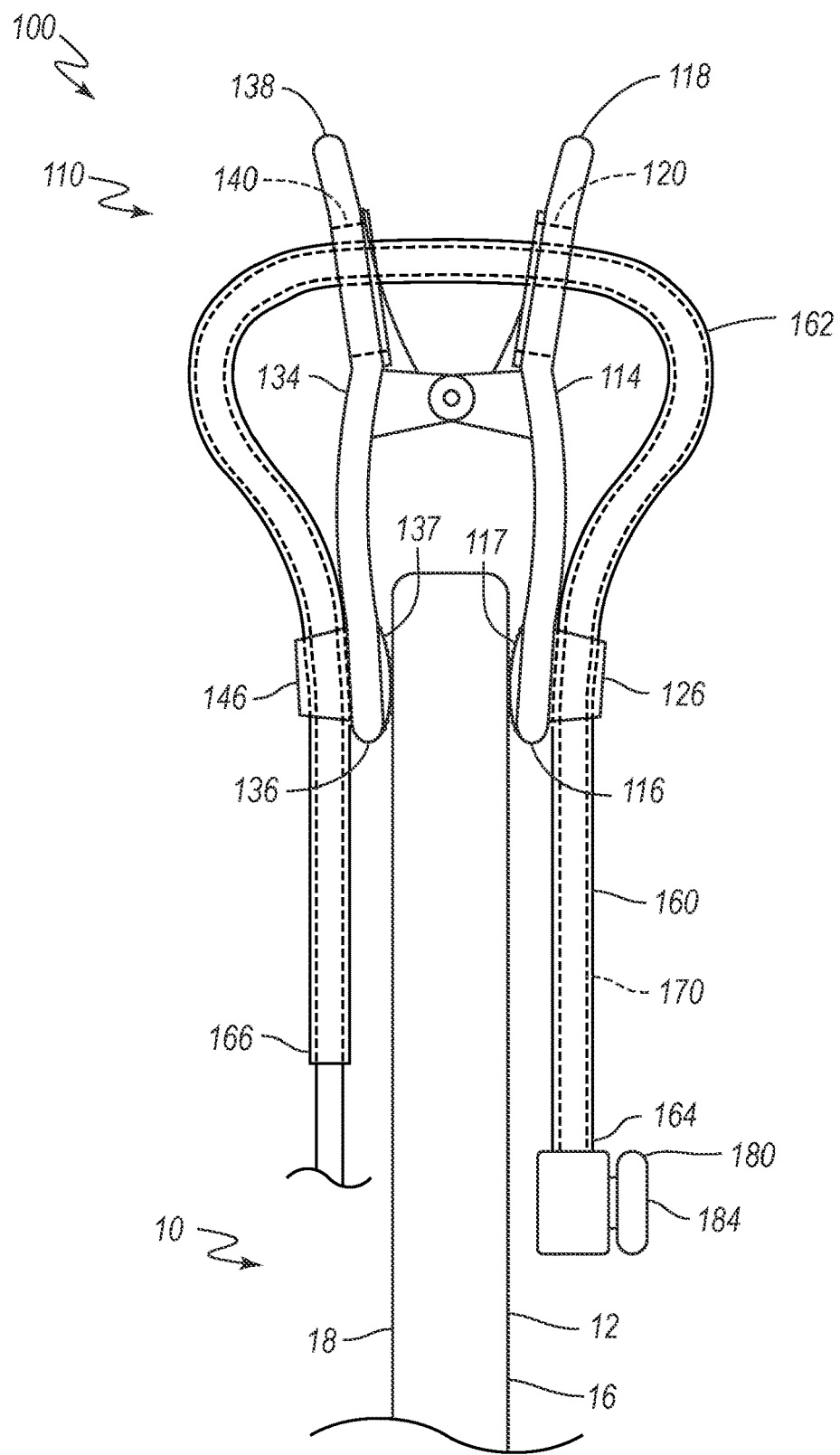
FIG. 4 is a side view of a portion of a computer monitor with a center webcam system, according to one embodiment of the present disclosure.

FIG. 4 is a side view of a portion of display 10 with the center webcam system 100. The clip 110 of the center webcam system 100 is coupled to the display 10. The first and second components 114, 134, as well as their respective first ends 116, 136 and second ends 118, 138 are shown for reference. The front 16, with the display area 12 identified, of the display 10 is shown for reference. A back 18 of the display 10 is also identified. The clip 110 may be retained in the position and attitude shown by means of the biasing member (see the biasing member 150 in FIG. 2A). The semi-rigid flexible conduit 160 may change shape when a force is applied to the semi-rigid flexible conduit 160 and may maintain that shape until a force is applied to the semi-rigid flexible conduit 160. This characteristic of changing shape under a force, then retaining the shape until another force is applied, permits positioning the semi-rigid flexible conduit 160 at the clip 110 in at least the configurations herein described or shown.

The semi-rigid flexible conduit 160 comprises the body 162 of the semi-rigid flexible conduit 160, the first end 164, and the second end 166. The semi-rigid flexible conduit 160 travels upward from the camera 180 to pass through the first securement mechanism 126 of the first component 114, through the first aperture 120, through the second aperture 140, and through the second securement mechanism 146. The second end 166 of the semi-rigid flexible conduit 160 may be disposed at, near, or behind the back 18 of the display 10, or at another convenient location (e.g., to accommodate routing of the cable 170 to couple with the computer).

The cable 170 is disposed within the semi-rigid flexible conduit 160 and, necessarily, follows the same path as the semi-rigid flexible conduit 160. The semi-rigid flexible conduit 160 may be retained in position, e.g., by interference fit, compression fit, friction fit, etc., at the first securement mechanism 126 and the second securement mechanism 146. The camera 180 is disposed at the first end 164 of the semi-rigid flexible conduit 160. The camera 180 is oriented with the sensor 184 facing away from the display area 12 of the display 10 and toward a user.

While the clip 110 is shown in a particular vertical displacement relative to an upper aspect of the display 10, this is for convenience of the disclosure only, and not by way of limitation. The clip 110 may be disposed lower on the display 10 according to a user's preference. Furthermore, disposition of the clip 110 at an upper aspect of the display 10 is for convenience of the disclosure and not by way of limitation. The clip 110, and, ergo, the center webcam system 100, may be disposed at a lateral edge of the display 10 whereby the semi-rigid flexible conduit 160, while still following the routing described above, may be generally parallel to a surface such as, e.g., a desktop or other support for the display 10, or to a keyboard deck of a laptop computer, etc. Said otherwise, the clip 110 may be attached at a side of a display 10 whereby the center webcam system 100 extends the semi-rigid flexible conduit 160 laterally to dispose the camera 180 toward/at a center of the display area 12 of the display 10. Similarly, when the center webcam system 100 is employed with a free-standing display 10, the clip 110 may be attached at a lower edge of the computer monitor whereby the semi-rigid flexible conduit 160 extends upward to dispose the camera 180 toward/at a center of the display area 12 of the computer monitor. Likewise, the center webcam system 100 may feasibly be mounted to a structure adjacent or near the display 10 (or any other location desired by a user) with the only limitations found in (1) capability of electrically and communicatively coupling the camera 180 to a computer, and (2) fitment of the clip 110 to the structure.

FIGS. 5A-5C are side views of the center webcam system 100 wherein vertical adjustment 190 is illustrated. FIG. 5A is a side view of the center webcam system 100 showing upward repositioning of the camera 180, relative to FIG. 4, according to an embodiment of the present disclosure. The center webcam system 100 is configured such that the semi-rigid flexible conduit 160 is slidable within the first and second securement mechanisms 126, 146. The first and second securement mechanisms 126, 146 may each comprise or constitute a first and second conduit engagement member, respectively, and may be configured to releasably couple the semi-rigid flexible conduit 160 to the clip 110. The clip 110 is shown coupled to the display 10. The first and second components 114, 134 are shown for reference. The camera is shown in a first position 180a (analogous to the position of the camera 180 in FIG. 4) and in a second position 180b. Movement 192 of the semi-rigid flexible conduit 160 at the first securement mechanism 126 (upward movement) serves to reposition the camera upward (vertical adjustment 190) along the front 16 of the display 10 from the first position 180a to the second position 180b. The second position 180b may be at any point upward from the first position 180a. Along with the (upward) movement 192 at the first securement mechanism 126, the semi-rigid flexible conduit 160 may also be moved 192 at the second securement mechanism 146 (downward movement), disposing the second end 166 of the semi-rigid flexible conduit 160 further from the second securement mechanism 146. Furthermore, the body 162 of the semi-rigid flexible conduit 160 may be moved 192 through the first and second apertures 120, 140 (rearward movement). The cable 170 and the semi-rigid flexible conduit are configured to facilitate movement of the cable 170 with the semi-rigid flexible conduit 160 without assistance of or intervention by a user. Furthermore, while the first and second securement mechanisms 126, 146 are configured to retain the semi-rigid flexible conduit 160 in a chosen position, the retention may be easily overcome through manual application of a minor degree of force by a user without application of a tool. Cessation of the application of the minor degree of force permits the first and second securement mechanisms 126, 146 to again retain the semi-rigid flexible conduit 160 in the new position without application of a tool. The connector 172 capable of electrically and communicatively coupling the cable 170 and the camera 180 to a computing device, such as, e.g., a desktop computer, a laptop computer, a table computer, etc. The connector 172 may comprise components and devices to configure the connector 172 to comply with one or more industry standards for (a) providing power to the camera 180 through the cable 170 and (b) communicating image data from the camera 180 to the computing device.

FIG. 5B is a side view of the center webcam system 100 showing downward repositioning of the camera 180, relative to FIG. 4, according to an embodiment of the present disclosure. The clip 110 of the center webcam system 100 is shown coupled to the display 10. The first and second components 114, 134 are shown for reference. Similar to the upward movement described in conjunction with FIG. 5A, the camera 180 may be moved downward along the front 16 of the display 10 moving 194 the semi-rigid flexible conduit 160 downward through the first securement mechanism 126. When desired or appropriate, the body 162 of the semi-rigid flexible conduit 160 may be moved forward through the first and second apertures 120, 140, and/or the second end 166 may be moved 194 upward toward the second securement mechanism 146. In this manner the camera 180 may be moved (vertical adjustment 190) from a first position 180a (analogous to the position of the camera 180 in FIG. 4) downward to a third position 180c. As may be obvious, it is not requisite to move the camera 180 from the first position 180a to an intermediate position 180b (shown in FIG. 5A) before moving the camera 180 to the third position 180c.

FIG. 5C is a side view of the center webcam system 100 showing downward repositioning of the camera 180, relative to FIG. 4, according to an embodiment of the present disclosure. The clip 110 of the center webcam system 100 is shown coupled to the display 10. The first and second components 114, 134 are shown for reference. The semi-rigid flexible conduit 160 is shown having the second end 166 near the second securement mechanism 146 of the second component 134; however, a user may desire or need to position the camera 180 further downward. The camera 180 may be drawn 196 downward while the semi-rigid flexible conduit 160 is retained in its present position at the first and second securement mechanisms 126, 146. The cable 170 thus moves 196 through the semi-rigid flexible conduit 160 and through the first and second securement mechanisms 126, 146 and the first and second apertures 120, 140 to dispose the camera 180 (vertical adjustment 190) from a first position 180a (or another position, such as the examples shown by the second position 180b and third position 180c in FIGS. 5A and 5B, respectively) to another position 180d along the front 16 of the display 10. The movement 196 need not disturb the position of the body 162 of the semi-rigid flexible conduit 160 at the first and second apertures 120, 140. When appropriate, the cable 170 may be drawn in the opposite direction, at or near the second end 166 of the semi-rigid flexible conduit 160, to return the camera 180 to a position at or adjacent the semi-rigid flexible conduit 160.

Figure 6A:
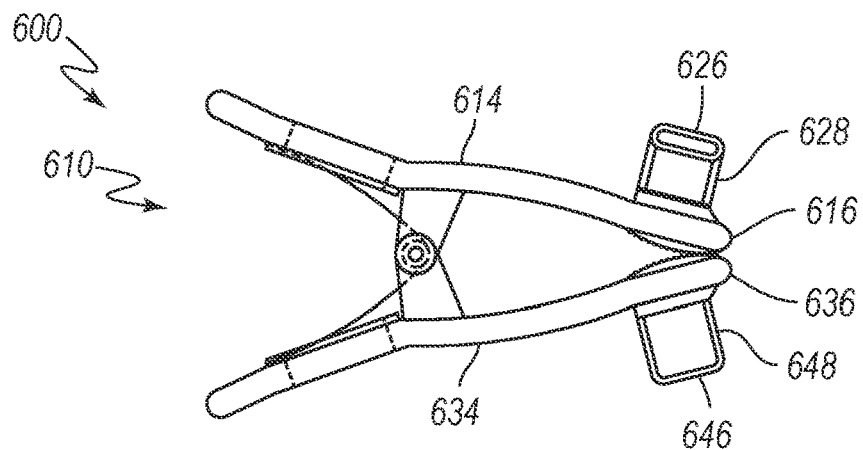
FIG. 6A is a side view of a clip of a center webcam system, according to one embodiment of the present disclosure.

FIG. 6A depicts an embodiment of a center webcam system 600 that resembles the center webcam system 100 described above in certain respects. Accordingly, like features are designated with like reference numerals, with the leading digit(s) incremented to "6." For example, the embodiment depicted in FIG. 6A includes a clip 610 that may, in some respects, resemble the clip 110 of FIGS. 1-5C. Relevant disclosure set forth above regarding similarly identified features thus may not be repeated hereafter. Moreover, specific features of the center webcam system 100 and related components shown in FIGS. 1-5C may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the center webcam system 600 and related components depicted in FIG. 6A. Any suitable combination of the features, and variation of the same, described with respect to the center webcam system 100 and related components illustrated in FIGS. 1-5C can be employed with the center webcam system 600 and related components of FIG. 6A and vice versa. This pattern of disclosure applies equally to further embodiments depicted in subsequent figures and described hereafter, wherein the leading digits may be further incremented.

Figure 6B:
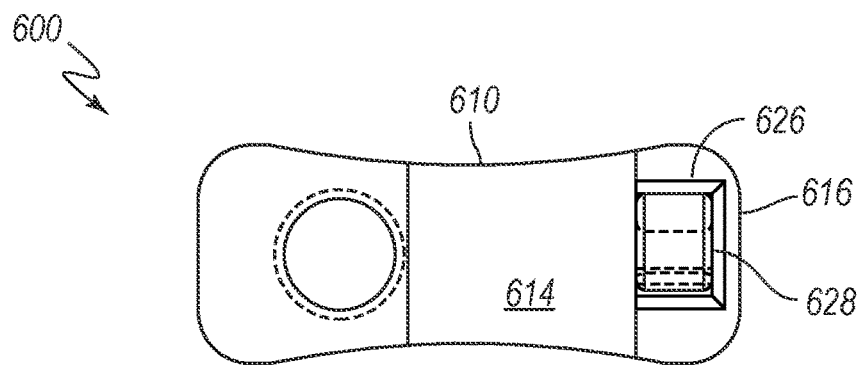
FIG. 6B is a top view of the clip of FIG. 6A, showing a first component.
Figure 6C:
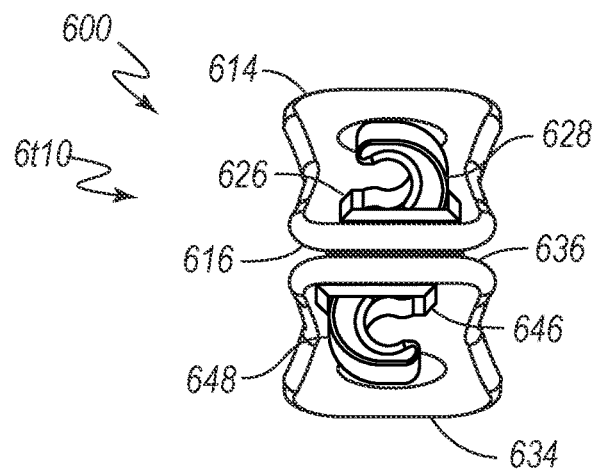
FIG. 6C is a front view of the clip of FIG. 6A.

FIGS. 6A-6C are detailed views of a clip 610 of a center webcam system 600 that is similar in at least some respects to the center webcam system 100 of FIG. 1, according to an embodiment of the present disclosure. FIG. 6A is a side view the clip 610 of the center webcam system 600. The clip 610 comprises a first and a second component 614, 634. The first component 614 comprises a first securement mechanism 626 disposed near a first end 616 of the first component 614. The second component 634 comprises a second securement mechanism 646 disposed near a first end 636 of the second component 634. The first and second securement mechanisms 626, 646 each comprises a hook 628, 648, respectively. The hooks 628, 648 are configured to retain in a preferred position a semi-rigid flexible conduit (similar in at least some respects to the semi-rigid flexible conduit 160 of FIGS. 1-5C), and to permit adjustment of the position of the semi-rigid flexible conduit as described above. The second component 634 is, essentially, a duplicate of the first component 614 that is rotated about an axis in order to interact with the first component 614.

FIG. 6B is a top view of the clip 610 and, more particularly, of the first component 614 of the clip 610 of the center webcam system 600 of FIG. 6A, according to an embodiment of the present disclosure. The first end 616 of the first component 614 is shown for reference. The first securement mechanism 626 is shown, as is the hook 628.

FIG. 6C is front view of the clip 610 of the center webcam system 600 of FIGS. 6A and 6B, according to an embodiment of the present disclosure. The first and second components 614, 634 are shown for reference. The first end 616 of the first component 614 and the first end 636 of the second component 634 are identified for reference. The first securement mechanism 626 comprises the hook 628, with the hook 628 having a general C-shape. In other words, when viewed from at least one angle, the hook 628 resembles a letter C. The second securement mechanism 646 similarly comprises a C-shaped hook 648. The first and second securement mechanisms 626, 646 and, more particularly, the hooks 628, 648 may be configured to retain in a preferred position a semi-rigid flexible conduit, and to permit adjustment of the semi-rigid flexible conduit through the hooks 628, 648 as described in conjunction with FIGS. 5A-5C.

It will be obvious to those having skill in the art that many changes may be made to the details of the above-described embodiments without departing from the underlying principles of the invention. The scope of the present invention should, therefore, be determined only by the following claims.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having reasonable skill in the art that changes may be made to the details of the above-described embodiments without departing from the underlying principles of the invention. Embodiments of the invention in which an exclusive property or privilege is claimed are defined as follows.

The invention claimed is:

1. A webcam system comprising:
   a camera;
   a cable with the camera coupled on a first end and a connector coupled on a second end, the connector to couple to a computing device, wherein the cable and the connector are configured to couple the camera to the computing device to enable the computing device to receive image data from the camera;
   a flexible conduit, wherein a portion of the cable is disposed within the flexible conduit with the camera disposed outside a first end of the flexible conduit and the connector disposed outside a second end of the flexible conduit; and
   a clip configured to couple to a display, the clip comprises a securement mechanism with a first arm that extends away from the clip,
   wherein the securement mechanism partially encompasses a circumference of a portion of the flexible conduit and secure the flexible conduit to the clip,
   wherein the clip is couplable to the flexible conduit, and
   wherein the webcam system is configured to position the camera on the display.

2. The webcam of claim 1, wherein the webcam system is configured to position the camera in a middle of a screen of the display.

3. The webcam system of claim 1, wherein the securement mechanism couples to the flexible conduit by an interference fit and an inner surface of the first arm directly engages the circumference of the portion of the flexible conduit.

4. The webcam system of claim 1, wherein the flexible conduit is slidable within the securement mechanism.

5. The webcam system of claim 1, wherein the flexible conduit is more rigid than the cable and less flexible than the cable.

6. The webcam system of claim 1, wherein the flexible conduit changes shape when a force is applied to the flexible conduit and maintains that shape until a force is applied to the flexible conduit.

7. The webcam system of claim 1, wherein the clip comprises a first component with a first end and a second end and a second component with a first end and a second end, wherein the first component is coupled to the second component at a pivot point that is disposed between the first ends and the second ends of the first and second components.

8. The webcam system of claim 7, wherein the clip comprises a biasing member that biases the clip to a closed configuration with corresponding first ends of the first component and the second component biased toward each other.

9. The webcam system of claim 8, wherein the biasing member is a torsion spring.

10. The webcam system of claim 7, wherein the clip is configured to couple to the display by engaging the display at an edge of the display on both a user facing side of the display and a back side of the display.

11. The webcam system of claim 10, wherein the display is pinched between the first end of the first component and a first end of the second component.

12. The webcam system of claim 7, wherein the securement mechanism is disposed on the first component between the first end and the pivot point.

13. The webcam system of claim 12, wherein, when the clip is coupled to the display, the flexible conduit is coupled to the first component of the clip on a user facing side of the display.

14. The webcam system of claim 12, wherein the securement mechanism comprises the first arm and a second arm that extend away from the first component, wherein an inner surface of the first arm and the second arm directly engage the circumference of the portion of the flexible conduit.

15. The webcam system of claim 7, wherein the securement mechanism is disposed on the first component between the first end and the pivot point and a second securement mechanism is disposed on the second component between the first end and the pivot point, wherein the securement mechanism is configured to couple the flexible conduit to the clip and the second securement mechanism is configured to couple the flexible conduit to the clip.

16. The webcam system of claim 7, wherein the first component comprises a first aperture that is disposed between the pivot point and the second end of the first component, wherein the first aperture is configured to receive the flexible conduit.

17. The webcam system of claim 16, wherein the second component comprises a second aperture that is disposed between the pivot point and the second end of the second component, wherein the second aperture is configured to receive the flexible conduit.

18. A webcam mount assembly comprising:
a flexible conduit configured to couple to a camera at a first end, the flexible conduit to position the camera inward from an edge of a display toward a middle of a screen of the display, wherein the flexible conduit is configured to extend from the camera at the first end to beyond the edge of the display; and
a clip to engage the edge of the display to couple the webcam mount assembly to the display, the clip comprising a first conduit engagement member with a first arm that extends away from the clip,
wherein the first conduit engagement member partially encompasses a circumference of a portion of the flexible conduit to receive and releasably couple the flexible conduit to the clip.

19. The webcam mount assembly of claim 18, wherein the first conduit engagement member comprises the first arm and a second arm that extend away from the first component, wherein an inner surface of the first arm and the second arm directly engage the circumference of the portion of the flexible conduit.

20. The webcam mount assembly of claim 18, wherein the first conduit engagement member is disposed on a first portion of the clip that is on a user facing side of the display.

21. The webcam mount assembly of claim 20, further comprising a second conduit engagement member to receive and releasably couple the flexible conduit to the clip that is disposed on a second portion of the clip that is on a back side of the display.

* * * * *